April 13, 1937.　　　T. D. ADAIR　　　2,077,086
METERING MECHANISM
Filed May 8, 1934　　　3 Sheets-Sheet 1

Inventor:
Thomas D. Adair
By Macleod, Calver, Copeland & Dike
Attorneys.

April 13, 1937.  T. D. ADAIR  2,077,086
METERING MECHANISM
Filed May 8, 1934  3 Sheets-Sheet 2
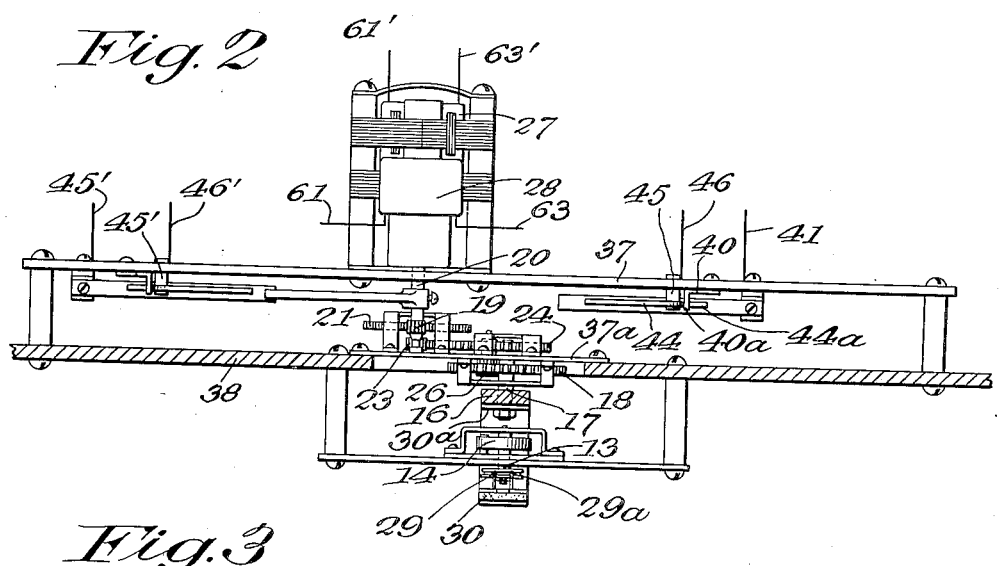
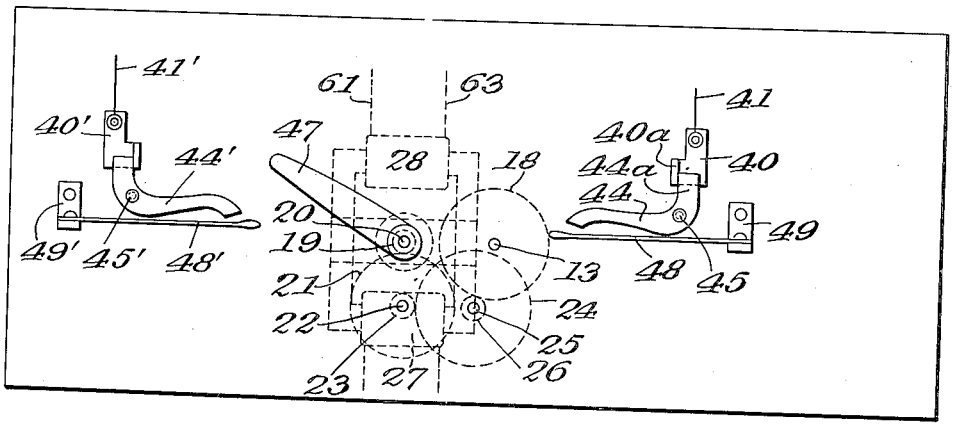
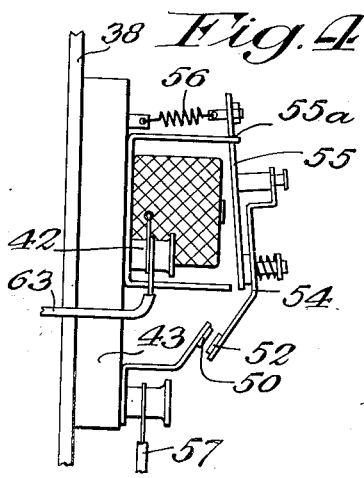
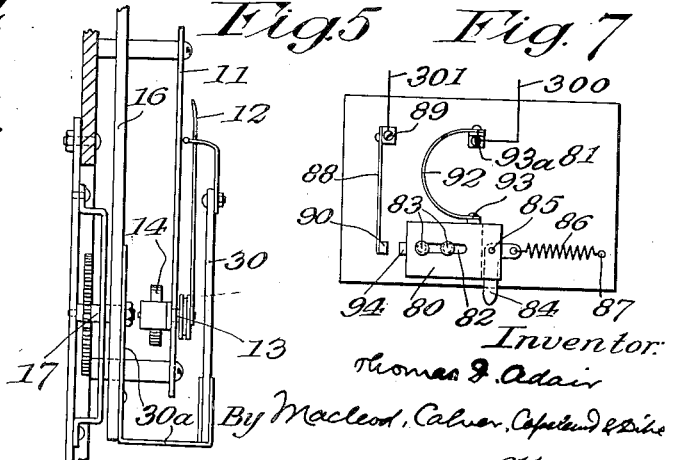
Inventor:
Thomas D. Adair
By Macleod, Calver, Copeland & Dike
Attorneys Patented Apr. 13, 1937

2,077,086

UNITED STATES PATENT OFFICE 2,077,086

METERING MECHANISM

Thomas D. Adair, Quincy, Mass., assignor to Standard Thermometer Inc., Boston, Mass., a corporation of Massachusetts Application May 8, 1934, Serial No. 724,514

4 Claims. (Cl. 177—351)

This invention relates to a new and useful improvement in means for repeating the movements of a delicate instrument in a larger and more powerful instrument. The special object of the present invention is to provide means for causing the movements of a rotating pointer with relation to a scale of a thermometer of the laminated metal type to be duplicated with relation to a scale on another signboard of larger size and different location and adapted for use as a large signboard thermometer. The mechanism, however, is adapted to repeat the readings in other manner than by a rotating pointer in relation to a scale to indicate temperature, that is, the pointer may operate on a track, vertically, horizontally or in any other direction. The indications may also be made with a roller curtain having indicating numbers printed thereon which can be presented at an opening in a dial.

Furthermore, the apparatus can be used for repeating the indications of instruments other than thermometers, such for instance as barometers, steam gauges, etc. It can be used for operating a valve at a distance and securing a desired amount of valve opening.

When the invention is embodied in a thermometer the repeating mechanism is briefly as follows: A thermometer of the pointer type is preferably used, in the particular case herein described the pointer being actuated by a bi-metallic coil. The pointer may also be operated by expansion of gases or liquids enclosed in a Bourdon tube or in a bellows. The pointer is connected to an electrical circuit and, according to conditions, is adapted to contact with one or the other of two contact points which are carried by a movable arm operating concentrically with said pointer and actuated by a gear train connected with an electric motor. A relay is used in the circuits of each contact point for the purpose of obtaining a definite movement of the moving arm after each contact is made and for amplifying the primary current. This definite movement is for two purposes, first, to save the contact points from continued arcing, and second, to make a definite measured movement which is to be repeated in a repeating mechanism. Under certain conditions the pointer will be out of contact with both of said two contact points.

In this particular embodiment of the invention a gear train is provided with two synchronous motors of clockwise and counterclockwise rotation which will operate one gear of the gear train at one revolution per minute. However, any type of motor other than synchronous may be used. To this gear, which operates at one revolution per minute, an arm is attached which will operate to stop the movement of the moving arm by breaking the electrical circuit through which the motor functions. This breaking mechanism will be described later. From the stage in the gear train where the circuit breaking mechanism is located, there is a continuation of gearing that reduces the movement of the moving arm which carries the contacts before mentioned, to an amount equal to a degree of temperature on the scale of the controlling thermometer. This movement may be more or less than one degree if desired, the gearing selected being the controlling factor. The relay previously mentioned closes the circuit when a contact is made, and it is so wired that the circuit will remain closed after the motor starts and the initial contact at the pointer is broken, and continues to remain closed until the circuit breaker operates.

The above mechanism operates as follows: Assuming that the temperature is rising, then the primary thermometer pointer which is of electric conducting material will contact with an electric contact on the moving arm, thereby closing an electric circuit which includes a relay, a circuit breaker and a motor. The motor revolves and through the gear train the movable arm starts to move. The initial contact will be broken almost immediately but the relay will remain closed through a shunt circuit, and the motor will continue to revolve until the mechanical breaker opens the shunt circuit. The pointer will then be between the two moving contacts but not touching them. The circuit through one contact of the moving arm operates the clockwise motor, and the circuit through the other contact operates the counter-clockwise motor, both motors being on the same shaft which operates the gearing. The above describes the controlling mechanism.

There is provided a repeating mechanism as follows: The control mechanism without the thermometer but with the moving arm, which will not require contacts, can be made to serve as a repeater if the motors and gearing are made to operate through a cycle which is of less time duration than the controlling mechanism. The relays of the control mechanism start a cycle of operations in the control mechanism, one of which operations is to make an electrical contact which starts a cycle of operations in the repeat mechanism.

The repeat mechanism is preferably geared to operate in a shorter period of time than the control mechanism so that its cycle of operation will be concluded before the control mechanism completes its cycle. The reason for this is to have the repeat mechanism ready to start a new cycle if the control mechanism follows the cycle with another immediately after completing the first cycle.

*Breaker mechanism*

The breaker mechanism must be so made that when a circuit is broken the contact will be immediately reestablished. It also must be so constructed that when the circuit is broken the period of non-contact will continue for a sufficient time to permit the relay circuit to open.

The invention will be more clearly understood from the following description in conjunction with the accompanying drawings: in which, Fig. 1 is a diagrammatic view in elevation of the apparatus embodying the invention;

Fig. 2 is a section on line 2—2 of Fig. 1;

Fig. 3 is a detailed view showing the operation of the breakers;

Fig. 4 is a side elevation of one of the relays;

Fig. 5 is a vertical section on line 5—5 of Fig. 1;

Fig. 7 is an enlarged detail view of a portion of Fig. 6.

Figure 1:
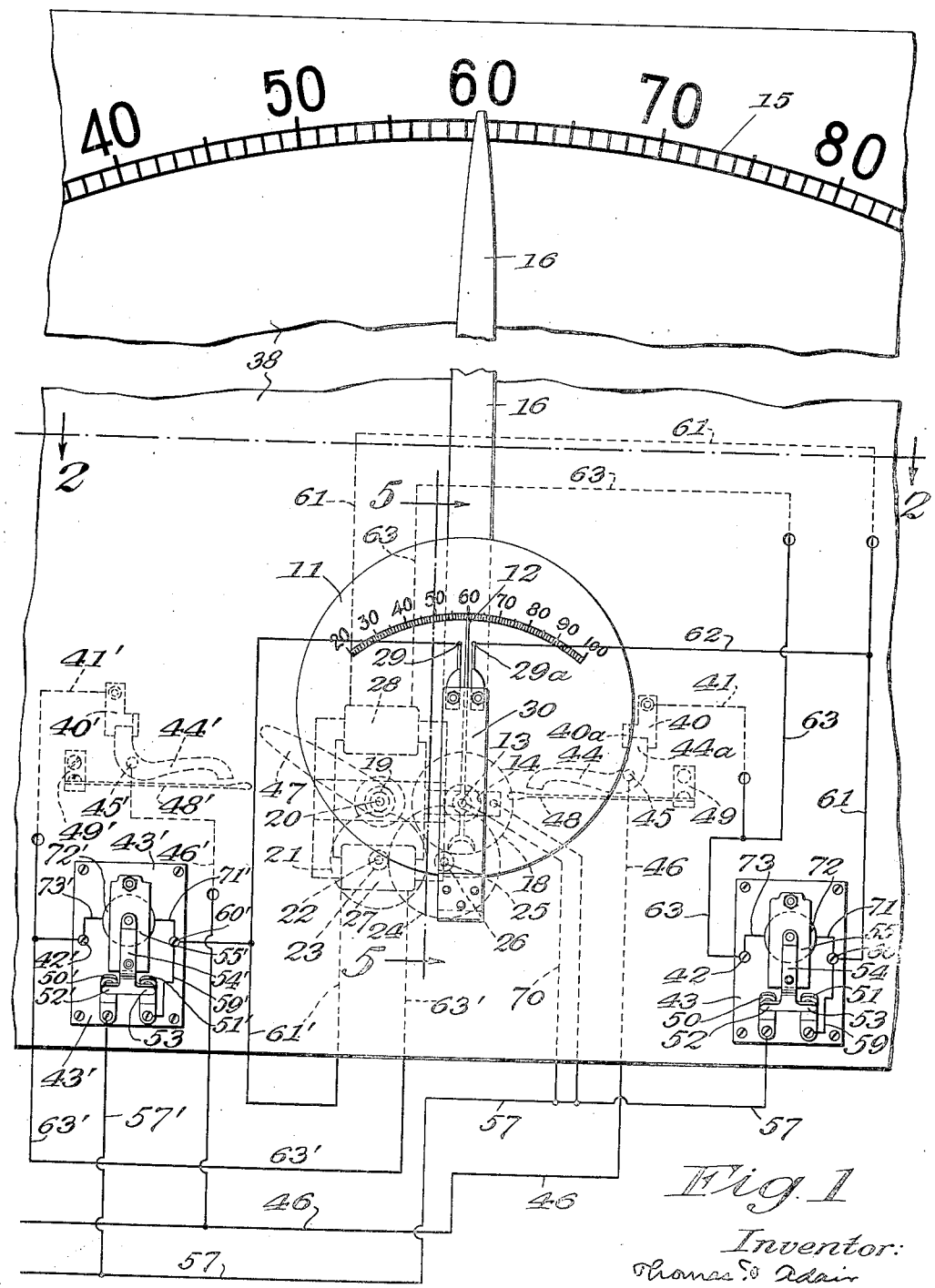

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, in Figs. 1 to 5 there is shown at 11 a dial which will for convenience be referred to as the primary dial of a bi-metallic thermometer mounted on a suitable support. A pointer 12 is mounted on a shaft 13 to which is connected one end of a thermostat coil 14 which may be of any well known type for use in a bi-metallic thermometer. The shaft 13 is rotatable on its axis by the coil as the coil coils or uncoils according to the changes in temperature and thereby turns the pointer 12 on its pivot to the right or left to indicate the changed temperature on the dial 11.

A dial 15 which will be referred to as the secondary dial, preferably made on a much larger scale than the primary dial so that it can be read from a distance, is provided with a pointer 16 or other form of indicator mounted on a shaft 17. Said dial 15 is graduated to show degrees of temperature to be indicated by the pointer 16. This secondary pointer 16 is controlled and actuated in its movement by suitable driving connection with the primary mechanism as will be hereinafter described and is preferably of much larger size than the primary pointer.

Before describing the means by which the primary mechanism actuates and controls the secondary driving mechanism, the secondary intermediate driving mechanism itself will be described. The large secondary pointer 16 is mounted fast on the rocker shaft 17 on which is mounted fast a gear wheel 18 which is rotated or rocked on its axis forward or back according to changes in temperature by suitable intermediate gear connection with a pinion 19 mounted on shaft 20. The driving connections for pinion 19 itself will be more particularly described hereinafter.

The driving connection between pinion 19 and gear wheel 18 is as follows: Pinion 19 engages with a gear 21 mounted on shaft 22 which carries a pinion 23. Said pinion 23 engages with a gear 24 mounted on shaft 25 which in turn carries a pinion 26 which engages with gear 18.

The shaft 20 which carries pinion 19 has a driving connection with two electric motors 27 and 28, one of which is adapted to rotate the pinion 19 in a direction to cause the pointer 16 to move forward to indicate a rise in temperature and the other is adapted to rotate the pinion 19 in a reverse direction to cause the pointer to move backward to indicate a lowering of the temperature.

Normally while the temperature is stationary the pointers 12 and 16 are both stationary.

The shaft 20 and pinion 19 are moved only when the circuit through one of the motors 27, 28 is closed and this is controlled by the movement of the pointer 12 of the primary thermometer to close one of the circuits through one or the other of the two contact points 29 or 29a mounted on arm 30 of a U-shaped bracket. Said arm 30 is of insulating material and extends up in front of the dial 11 but not in contact therewith and the other arm 30a extends up behind the dial but not in contact therewith. The pointer 16 is made fast to said rear arm 30a.

The pointer 12 is of metal or other electric conducting material and extends up through the opening between the two contact points 29, 29a and normally is not in contact with either of them. Said contact points are fast to the bracket arm 30.

With increase of temperature the pointer 12 will move to the right into contact with the contact point 29a. With decrease of temperature the pointer will move to the left into contact with the contact point 29.

The secondary pointer 16 is normally stationary. When the temperature rises and the pointer 12 moves into contact with the contact point 29a it will close the circuit through the motor 28, and thereby through the connected mechanism cause the pointer 16 to move forward.

When the temperature falls the primary pointer 12 will swing to the left and make contact with the contact point 29 and close the circuit through the motor 27 and thereby, through the connecting mechanism, cause the pointer 16 to move backward. Pointer 12 is electrically connected, as by wire 70, with a source of electricity not shown.

The shaft 20 passes loosely through holes in the bracket plates 37 and 37a which are secured to the back face of the frame member 38 on which the secondary dial 15 is mounted. Plate 37 is spaced some distance back of plate 37a and is parallel therewith. Mounted on the said plate 37 is a contact bracket 40 having a projecting finger 40a. Said bracket 40 forms an electric terminal for one end of a wire conductor 41. The wire 41 is connected at its other end with a binding post 42 carried by a plate 43 secured to the frame member 38. An elbow shaped contact member 44 which acts as a lever is pivoted intermediate its ends at 45 to plate 37 from which it is insulated. One arm 44a of said pivoted contact member 44 is adapted to make and break contact with the member 40a. Said pivoted contact member 44 has electric connection through its pivot 45 with an electric wire 46 whose other end is connected with the main electric circuit.

Mounted on the shaft 20 is a lever 47 of nonconducting material which after a certain degree of rotation of the shaft 20 will engage the free end of a spring 48 which is secured at its other end to a bracket 49 and thereby bend said spring downwardly. As soon as the lever 47 rides off said spring the spring will fly up and strike the underside of the outer end of the pivoted contact lever 44 and tip said lever on its pivot so that its contact arm which engages the contact member 40a will be thrown out of contact with said member 40a and thereby temporarily open the circuit through which the secondary pointer 16 is moved and cause the said pointer 16 to stop.

As soon as the lever 47 rides past the spring 48 and the said spring snaps back to its normal position the pivoted contact lever 44 will again come into contact with the fixed contact 40a.

The motor 28 is for the purpose of controlling the mechanism which comes into play when the temperature rises and the pointers both move to the right. Said motor is electrically connected with the plate 43 as shown at the right hand portions of Figs. 1 and 2, as already described.

The motor 27 is for controlling the mechanism which comes into use when the temperature falls and the indicators turn to the left. The several elements which come into play on the rising temperature have already been described. The several elements which specially come into play when the temperature falls are designated by numerals corresponding with those used in describing the rising temperature except by designating them respectively as 40′, etc.

Mounted on the insulating plate 43 are two stationary electric contact points 50 and 51 which are adapted to be engaged respectively at certain times by the two contact points 52, 53 carried by the arms of a movable contact lever 54. Contact lever 54 is mounted on a holder plate 55 pivoted at 55a and which is normally held back by a spring 56 so that the contact of points 50 and 51 with 52 and 53 respectively is broken (see Fig. 4). Fixed contact point 50 is connected by wire 57 with the main source of electricity.

Fixed contact point 51 has electric connection by wire 59 with post 60 thence by wire 61 with one terminal of the motor 28 and having a branch wire 62 which leads to the terminal 29a.

A wire 63 connects post 42 with the other terminal of the motor 28.

In operation, when the pointer 12 of the thermometer engages the contact 29a, it closes the circuit. The current then flows from wire 57, through wire 70, pointer 12, contact 29a, wires 62 and 61 and connection 71 to coil 72 of the relay and from this, through connection 73, contact 42, wires 63, 41 and through contacts 40a and 44a of the break mechanism to wire 46. The current also passes from 61 to motor 28 and thence through wires 63 and 41 and contacts 40a and 44a to wire 46. This will energize the coil 72 of the relay and arm 54 will form contact at 50, 52 and 51, 53, thus forming a third path for the current as follows—from wire 57 to contacts 52, 50 and 53, 51, connection 59 to 60, connection 71 to coil 72, connection 73, contact 42, wires 63 and 41 to contacts 40a and 44a of the break and thence to wire 46.

When this passage of current takes place, the motor 28 starts and through the train of gears moves the arm 30, which carries contact 29a, in a clockwise direction, thus breaking its contact with the pointer 12. But since the current has other paths, already described, to the motor 28, the motor 28 will keep rotating until the break mechanism operates and momentarily breaks the electric circuit, which happens when the thermostat pointer 12 is at or near the center between contacts 29 and 29a.

The momentary interruption of the circuit by the action of the break, will allow the spring 56 of the relay to break the circuit at points 50, 52 and 51, 53, thus opening the entire control circuit, stopping the motor 28, and leaving the whole mechanism in position until arm 12 engages contact 29a again.

This description covers only the action of the mechanism and wiring for the clockwise movement of the thermostat pointer 12.

The mechanism and wiring for the anti-clockwise movement is a repetition of the first.

The breaker arm 47 which is attached to the control mechanism serves to break the circuits of both the motors which respectively control the forward and the reverse movement of the indicator.

So far as I am aware, the feature of mechanically moving the contacts 29 and 29a by means of a motor and gearing is new with me. They should be moved a definite distance, far enough to eliminate arcing at the contacts and so that the remote repeater can also be moved through a corresponding definite motion.

Preferably there is a relatively high gearing ratio between the motor and the mechanical movement required. As motors will revolve by momentum after the electric current is cut off, the movement required should not be dependent on the motor stopping at some exact number of turns after the current is cut off. By my method, due to the reduction gearing which serves as a brake, the motor is caused to stop before the lever which causes the break has moved through more than a small part of its total movement. In my construction, if the motor overruns its usual stopping position on one cycle, it will underrun on other cycles. It would have to overrun equivalent to a complete extra cycle to create a permanent error and because of the reduction gearing this never can occur. Therefore, motors may be used which have only approximate uniformity of action.

Figure 6:
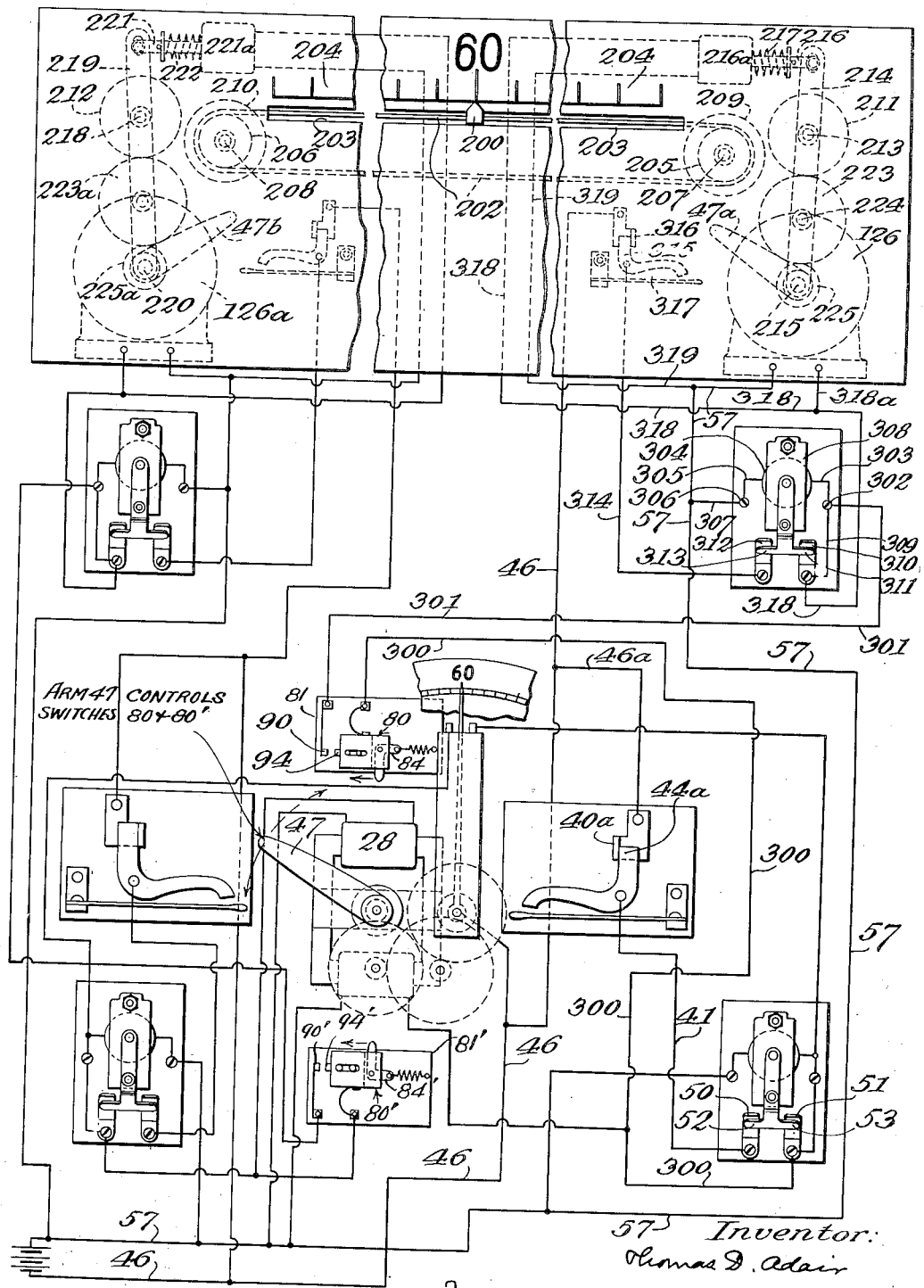
Fig. 6 is a diagrammatic view of a modified form of the invention.

In the modification shown in Figs. 6 and 7 the mechanism shown in the lower half of Fig. 6 is very similar to that shown in Figs. 1 to 5 except that there is a modified form of mechanism for opening and closing the circuit which controls the movement of the secondary pointer shown at the right and left portions of Fig. 3. This form is intended for use where it is desired to have the secondary dial located at a distance from the primary dial. The arm 47 serves to make the necessary contacts to start the motors. In its complete circuit it must make the contacts for the repeat motors and these contacts can be set at 180° apart. The contact arm in making its circuit in a clockwise direction must only make an actual contact for the proper repeat motor and therefore the contact must be made so that the contact arm will operate the contact in one direction only. That is, it must make the contacts for the respective motors to get the proper direction of rotation. When in its circuit it passes the contact for the other circuit it must be caused to pass it without making the contact. That is, the contact members of the two circuits should be so arranged that in one case the contact would be made only when the contact arm moves in a clockwise direction and the contact for the other circuit should be made only when the contact arm moves counterclockwise.

The arm 47 operates a metal slidable block 80 mounted on a base 81 of insulating material. The block 80 is formed with an elongated slot 82 and as the block is moved it is guided by the pins 83, 83 which project from the base 81 and engage in said slot 82. The block 80 moves back and forth. This movement is accomplished by the dog 84 pivoted on a pin 85 carried by the block 80.

A spring 86 is attached at one end to the dog 84 and at its other end to a pin 87 in the insulation base 81. Said spring serves to retract the slide block 80 to the position shown in Fig. 7 and it also serves to keep the dog 84 normally in the position shown.

A flat spring 88 is mounted fixedly near one end thereof on a terminal 89 secured to the base 81 and has on its free end a contact 90 which may be sprung so that the contact moves in an arc of a circle.

A flexible tape 92, preferably of braided copper, is fastened at one end at 93 to the sliding block 80 and is fastened at its other end to the terminal 93a attached to the base member 81. This serves to carry electric current from a contact 94 mounted on the slide block 80 to the point 93 where it is connected to an electric circuit. The terminal 89 is also connected to the electric circuit.

The operation of this contactor is as follows: Assuming that the arm 47 is moving in a counterclockwise direction, it will strike the dog 84. As said dog is prevented from rotating in that direction in the block 80, said block will be caused to slide in the direction of the arrow shown on this block, thus making the two contacts 90 and 94 come together. The block 80 will continue, thus bending the spring 88 until the point of the arm 47 clears the dog 84 when the block 80 will be retracted to the original position shown in the drawings.

For clockwise movement of the arm 47 the point of the arm will engage the dog 84. As the block 80 cannot move in the direction taken by the arm 47, the dog 84 will rotate about the pin 85 until the point of the arm 47 clears the dog 84, after which the dog will resume the position shown in the drawings.

The purpose of the contactor is to allow the arm 47 to rotate in either direction and to operate the contacts 90, 94 when the arm 47 operates in one direction only.

Two of these contacts will be required on this control device. These should be preferably placed 180° apart in the path of the point of the arm 47. One of these contactors should be arranged to make the desired contact for clockwise rotation and the other contactor should be arranged to make the desired contact for counterclockwise rotation.

In the upper part of Fig. 6 there is shown intermediate the primary and secondary dials, means for aiding the mechanism shown in the lower part of said figure to control and actuate the secondary indicator when the secondary dial is located at considerable distance from the primary. There is also shown a modified form of secondary indicator.

In the upper portion of Fig. 6 the secondary indicator is shown as consisting of a pointer 200 carried by an endless chain 202 which is adapted to move to the right or left according to the rise and fall in temperature. Said pointer slides in an opening 203 under the dial shown at 204.

The chain is driven on two sprocket wheels or pulleys 205, 206, one at each end. These wheels are mounted respectively on shafts 207 and 208. Gear wheel 209 is adapted to be engaged by a gear wheel 211 to rotate the gear 209 and therefore move the pointer 200 to the right, and gear 210 is adapted to be engaged by the gear 212 to move said pointer to the left. In the drawings said gears 211 and 212 are both shown out of engagement with the gears 209 and 210, so that the pointer is at rest. Gear 211 is pivoted at 213 on a rocker arm 214 rotatably mounted on shaft 215 of motor 126, the other end of said lever being pivoted to a slide rod 216 forming part of solenoid 216a and which is normally held by a spring 217 in the position shown in Fig. 6 to keep the gear 211 disengaged from the gear 209.

Gear 212 is mounted on an axle 218 carried by a rocker arm 219 rotatably mounted on shaft 220 of motor 126a, the other end of said lever being pivoted to a slide rod 221 forming part of a solenoid 221a and is normally held by a spring 222 in the position shown in Fig. 6 to keep the gear 212 disengaged from gear 210.

Instead of a single lever 47 to act for both the rising and falling temperature, there are two such levers, namely 47a and 47b, one for the rising and one for the falling temperature. Lever 47a is mounted on shaft 215 on which rocker arm 214 is mounted and is operatively connected with gear 211 by gear 223 on shaft 224 and in connection with pinion 225 on shaft 215.

Pinion 225a, gear 223a and gear 212 form driving connections between motor 126a and gear 210.

The operation of the modified form shown in Fig. 6 is as follows:

When the motor 28 of the control mechanism is operating as previously described, contacts 94 and 90 are brought into engagement with each other by lever 47, thus momentarily closing the circuit of the repeating mechanism. The current will then flow from 46 through 46a to the contacts 40a and 44a of the break mechanism to wire 41, contacts 50, 52 and 51, 53, wire 300, contacts 90 and 94, wire 301, binding post 302, connection 303, and coil 304; and from there through connections 305, binding post 306, wire 307 back to main wire 57. This will close the relay 308 which will cause the current to also pass from binding post 302 and through wire 309, contacts 310, 311, 312 and 313 and wire 314 to contacts 315, 316 of the repeater breaker 317 and from there to main wire 46. Furthermore, the current will also pass from contacts 310, 311 through wires 318 and 318a to motor 126, to main wire 57 and from 318 to solenoid 216a, thence to 57 through wire 319.

The contact at 90, 94 is momentary, but once the relay 308 closes, it will remain closed until the circuit is broken at some other place than at 90, 94. This is accomplished at breaker 317, which is mechanically operated by lever 47a on shaft 215 of motor 126, and it occurs after motor 126 has operated gears 225, 223 and 211 to obtain the movement of the pointer 200 through its chain 202, sprocket 205 and gear 209. Gear 211 is brought in mesh with gear 209 when solenoid 216a is energized which happens at the same time the motor 126 is started. When the circuit is broken, solenoid 216a is deenergized and spring 217 throws arm 214 and gear 211 out of engagement with gear 209, thus allowing said gear 209, sprocket 205 and chain 202 to move in the reverse direction when motor 126a and the left side mechanism is in operation. The operation of this mechanism is identical with the right side one, consequently it does not need to be described.

It is desirable, though not essential, for the repeater mechanism to complete its function before the control mechanism completes its own function, so that if the control mechanism should repeat its cycle the remote repeater will be able to also repeat its cycle immediately. This can be obtained by the proper selection of motor and gearing in the repeater.

I claim:

1. In combination, a movable member, a movable contact, a movable element normally positioned adjacent to and spaced from said contact, means for actuating said movable element and said contact in response to movement of said movable member to cause said movable element to move an amount representative of the movement of said movable member and cause said contact to move an amount substantially equal to the movement of said movable member comprising two electrical circuits, one of said circuits including a switch, a motor and a normally closed circuit breaker, said circuits having a common portion including electrical means for actuating said switch, the other of said circuits including said movable member and said contact adapted to be engaged by movement of said member to close said circuit and actuate said electrical means to close said switch whereby the circuit containing said switch is maintained closed after said other circuit is opened by movement of said contact away from said member, and a device actuated by said motor for opening said circuit breaker.

2. In combination, a pair of spaced contacts, a movable member normally positioned between said contacts, a movable element, means for actuating said movable element and said contacts in opposite directions to cause said movable element to move an amount representative of the movement of said movable member and cause said contacts to move an amount substantially equal to the movement of said movable member in response to movement of said movable member in opposite directions comprising two electrical systems each including a pair of electrical circuits, one of the circuits of each pair including a switch, a motor and a normally closed circuit breaker, the circuits of each pair having a common portion including electrical means for actuating said switches, the other of the circuits of each pair including said movable member and one of said pair of contacts adapted to be engaged by movement of said member to close said circuit and actuate said electrical means to close said switch whereby the circuit containing the switch is maintained closed after the other circuit is opened by movement of said one contact away from said member, and a device adapted to be actuated by either of said motors for opening said circuit breakers.

3. In combination, a movable member, a movable contact, a movable element, a pair of electrical circuits, one of said circuits including a switch, a motor and a normally closed circuit breaker, means actuated by said motor for moving said contact an amount substantially equal to the movement of said movable member, said circuits having a common portion including electrical means for actuating said switch, the other of said circuits including said movable member and said contact adapted to be engaged by movement of said member to close said circuit and actuate said electrical means to close said switch whereby the circuit containing said switch is maintained closed after said other circuit is opened by movement of said contact away from said member, a device actuated by said motor for opening said circuit breaker, means adapted to be actuated by said device for moving said movable element a predetermined amount.

4. In combination, a movable member, a movable contact, a movable element, a pair of electrical circuits, one of said circuits including a switch, a motor and a normally closed circuit breaker, means actuated by said motor for moving said contact an amount substantially equal to the movement of said movable member, said circuits having a common portion including electrical means for actuating said switch, the other of said circuits including said movable member and said contact adapted to be engaged by movement of said member to close said circuit and actuate said electrical means to close said switch whereby the circuit containing said switch is maintained closed after said other circuit is opened by movement of said contact away from said member, a device actuated by said motor for opening said circuit breaker, means for actuating said movable element including a pair of secondary electrical circuits, one of said secondary circuits including a secondary switch, a secondary motor and a secondary normally closed circuit breaker, said secondary circuits having a common portion including secondary electrical means for actuating said secondary switch, the other of said secondary circuits including a movable secondary contact, means tending to move said movable contact to open said other secondary circuit, said movable secondary contact being adapted to be engaged by said device to close said other secondary circuit and actuate said secondary electrical means to close said secondary switch whereby the circuit containing said switch is maintained closed after said other secondary circuit is opened by movement of said secondary movable contact, and a secondary device actuated by said secondary motor for opening said secondary circuit breaker.

THOMAS D. ADAIR.